United States Patent
Gwak et al.

(10) Patent No.: US 8,538,190 B2
(45) Date of Patent: Sep. 17, 2013

(54) APPARATUS, METHOD, AND RECORDING MEDIUM FOR REDUCED NOISE IMAGE PROCESSING

(75) Inventors: Jin-pyo Gwak, Suwon-si (KR); Soon-geun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1050 days.

(21) Appl. No.: 12/511,321

(22) Filed: Jul. 29, 2009

(65) Prior Publication Data

US 2010/0027891 A1 Feb. 4, 2010

(30) Foreign Application Priority Data

Aug. 1, 2008 (KR) .................. 10-2008-0075573

(51) Int. Cl.
*G06K 9/40* (2006.01)
*G06K 9/46* (2006.01)
*G06K 9/66* (2006.01)
*G06K 9/48* (2006.01)
*G06K 9/74* (2006.01)
*G06K 9/36* (2006.01)

(52) U.S. Cl.
USPC ........... 382/266; 382/190; 382/194; 382/199; 382/213; 382/263; 382/265; 382/283

(58) Field of Classification Search
None
See application file for complete search history.

(56) References Cited

U.S. PATENT DOCUMENTS

| | | | | |
|---|---|---|---|---|
| 5,933,540 | A * | 8/1999 | Lakshminarayanan et al. | 382/260 |
| 6,285,798 | B1 * | 9/2001 | Lee | 382/260 |
| 7,082,218 | B2 * | 7/2006 | Pollard et al. | 382/167 |
| 7,995,857 | B2 * | 8/2011 | Wang | 382/266 |

FOREIGN PATENT DOCUMENTS

| | | |
|---|---|---|
| JP | 2004-173065 A | 6/2004 |
| KR | 1020060097473 A | 9/2006 |
| KR | 1020070018606 A | 2/2007 |
| KR | 1020070024333 A | 3/2007 |

* cited by examiner

*Primary Examiner* — Matthew Bella
*Assistant Examiner* — Thomas Conway
(74) *Attorney, Agent, or Firm* — Drinker Biddle & Reath LLP

(57) ABSTRACT

Provided are an image processing method and apparatus for effectively reducing noise in an image, and a recording medium storing a program for executing the method. The image processing apparatus includes a noise reduction unit configured to apply a noise reduction filter to first image data to obtain second image data; a first edge data obtaining unit configured to calculate edge data lost in the second image data compared with the first image data to obtain the first edge data; and a first synthesis unit configured to tune the first edge data and calculate third image data from the second image data and the tuned first edge data.

20 Claims, 8 Drawing Sheets

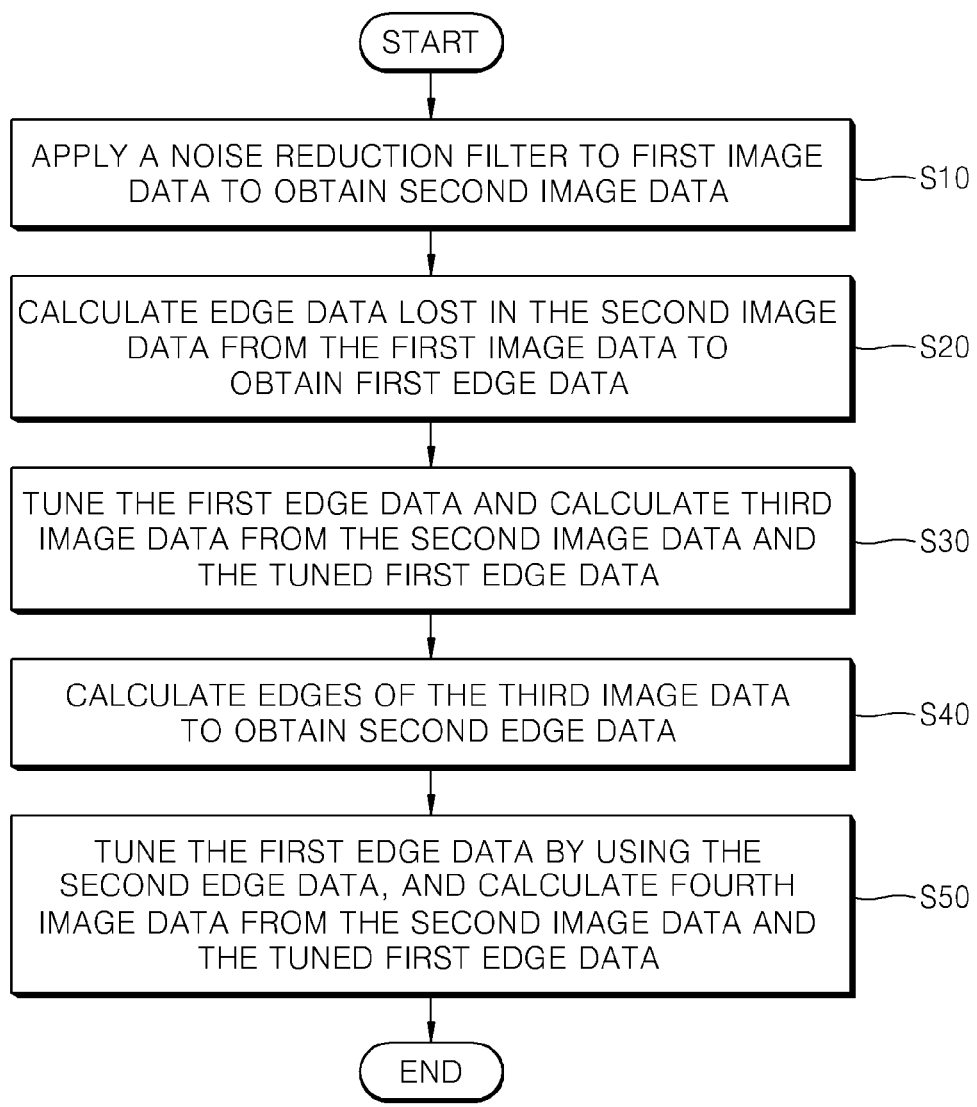

APPARATUS, METHOD, AND RECORDING MEDIUM FOR REDUCED NOISE IMAGE PROCESSING

CROSS-REFERENCE TO RELATED PATENT APPLICATION

This application claims the benefit of Korean Patent Application No. 10-2008-0075573, filed on Aug. 1, 2008, in the Korean Intellectual Property Office, the entire contents of which is incorporated herein by reference.

BACKGROUND OF THE INVENTION

1. Field of the Invention

The present invention relates to an image processing method and an apparatus, and recording medium storing a program for executing the method, and more particularly, to an image processing method and apparatus capable of effectively reducing noise in an image, and a recording medium storing a program for executing the method.

2. Description of the Related Art

An image processing apparatus may display an image from image data on a display unit by reproducing an image file stored in a storage medium. A digital photographing apparatus, which is a type of image processing apparatus, may photograph a subject in a shooting mode, store image data of the subject in a storage medium, reproduce an image file of the subject from the storage medium, and then display the image of the subject from the reproduced image file on a display unit.

The image data of the subject stored in the storage medium may contain noise. When an image processing apparatus displays an image that contains noise the quality of the displayed image is reduced. Thus there is a need to improve the quality of the displayed image by either displaying the image on the display so that noise is reduced or to process the image data to reduce or remove the noise.

Additionally, when image data is obtained using a digital photographing apparatus, which is a type of image processing apparatus, the image data may need to be processed in order to remove the noise from the image data.

FIG. 1 is an example of a first image containing noise. Conventionally, a bilateral filter is used to remove noise from an image. The resolution of a resultant image obtained by applying the bilateral filter to the image is degraded although noise is reduced therein. In general, a noise reduction filter, such as the bilateral filter, works by averaging or weight-averaging data of pixels in a region having a predetermined size based on an assumption that noise is evenly distributed.

Applying a noise reduction filter may lower the quality of some edges. An edge may be generally understood in an image as the boundary between two subjects or a crease in a subject's clothes. The boundary between the two subjects, which is clearly represented, may be referred to as a 'strong edge', and a crease in a subject's clothes may be referred to as a 'weak edge (minute edge)'. The degree or image quality of a strong edge is not significantly lowered by the bilateral filter but the degree of a weak edge may be greatly lowered by the bilateral filter. FIG. 2 is an example of a second image obtained by applying a noise reduction filter to the first image of FIG. 1. Comparing the weak edges of FIG. 1 to the weak edges of FIG. 2 it is apparent that the weak edges of FIG. 1 are lost after a noise reduction filter is applied, thus greatly degrading the texture of the clothes (knitwear) of a woman who is a subject. For example, by comparing the region of the knitwear 24 in FIG. 1 with the region of the knitwear 25 in FIG. 2, it is apparent that some of the creases in the knitwear are no longer visible in the region of the knitwear 25 in FIG. 2. A comparison of the strong edges of FIG. 1 and the strong edges of FIG. 2, illustrates that the strong edges are not greatly degraded after the application of a noise reduction filter. For example, by comparing the edge of the subject's hair 22 in FIG. 1 and the edge of the subject's hair 23 in FIG. 2, it is apparent that strong edges are not greatly degraded after the application of a noise reduction filter.

SUMMARY OF THE INVENTION

The present invention provides an image processing method and apparatus for effectively reducing noise in an image, and a recording medium storing a program for executing the method.

According to an aspect of the invention an image processing apparatus is provided including a noise reduction unit configured to apply a noise reduction filter to first image data to obtain second image data; a first edge data obtaining unit configured to calculate edge data lost in the second image data compared with the first image data to obtain the first edge data; and a first synthesis unit configured to tune the first edge data and calculate third image data from the second image data and the tuned first edge data.

The noise reduction unit may include a bilateral filter.

The first edge data obtaining unit of the image processing apparatus may calculate the first edge data from the difference between the first image data and the second image data.

The first synthesis unit of the image processing apparatus may be further configured to tune the first edge data by reducing the amplitude of the first edge data.

The first synthesis unit of the image processing apparatus may be further configured to combine the second image data with the tuned first edge data on a pixel by pixel basis.

The first synthesis unit of the image processing apparatus may be further configured to set a pixel value in the third image data to a predetermined maximum value when a pixel value in the third image has a value greater than a predetermined value.

The image processing apparatus may be further include a second edge data obtaining unit configured to calculate edges in the third image data as second edge data; and a second synthesis unit configured to tune the first edge data by using the second edge data and calculate fourth image data from the second image data and the tuned first edge data.

The second synthesis unit of the image processing apparatus may be further configured to tune the first edge data by multiplying a pixel of the first edge data by the corresponding pixel in the second edge data.

The second synthesis unit of the image processing apparatus may be further configured to set the result of tuning a pixel of the first edge data to the predetermined maximum value if the result of multiplying the pixel of the first edge data by the corresponding pixel of the second edge data is greater than a predetermined maximum value.

The second synthesis unit of the image processing apparatus may be further configured to calculate the fourth image data by combining the pixels of the second image data with the corresponding pixels of the tuned first edge data.

The second synthesis unit of the image processing apparatus may be further configured to set a pixel of the fourth image data to the predetermined maximum value when the pixel has a value greater than a predetermined maximum value.

According to an aspect of the invention an image processing method is disclosed including the steps of applying a noise reduction filter to first image data to obtain a second image; calculating first edge data lost in the second image data from the first image data; and tuning the first edge data and calculating a third image data from the second image data and the tuned first edge data.

Applying of the image processing method may include applying a bilateral filter to a first image data to obtain a second image data.

Calculating first edge data of the image processing method may include calculating first edge data lost in the second image data from the first image data based on the difference between the first image data and the second image data.

Tuning of the image processing method may include tuning the first edge data by reducing the amplitude of the first edge data.

Tuning of the image processing method may include tuning the first edge data and calculating third image data by combining the second image data on a pixel by pixel basis with the tuned first edge data.

The image processing method may include setting a pixel of the third image data to the predetermined maximum value if the pixel of the third image data has a value greater than a predetermined maximum value.

The image processing method may include calculating edges of the third image data as second edge data; tuning the first edge data by using the second edge data, and calculating a fourth image data from the second image data and the tuned first edge data.

Tuning of the image processing method may include tuning the first edge data by multiplying a pixel of the first edge data by the corresponding pixel of the second edge data.

The image processing method may include if the result of multiplying is greater than a predetermined maximum value, then setting the value of the pixel to the predetermined maximum value.

Calculating first edge data of the image processing method may include calculating a fourth image data by combining pixels of the second image data with the corresponding pixels of the tuned first edge data.

Calculating first edge data of the image processing method may include if a pixel of the fourth image data has a value greater than a predetermined maximum value, then setting the pixel to have the predetermined maximum value.

According to an aspect of the invention a computer readable medium is disclosed that is encoded with a computer executable program that when executed by a computer causes the computer to perform the following image processing method applying a noise reduction filter to first image data to obtain a second image; calculating first edge data lost in the second image data from the first image data; and tuning the first edge data and calculating a third image data from the second image data and the tuned first edge data.

According to an aspect of the invention a computer program product is disclosed that includes a computer-readable medium including: a first set of codes for causing a computer to apply a noise reduction filter to first image data to obtain a second image; a second set of codes for causing a computer to calculate edge data lost in the second image data compared with the first image data to obtain the first edge data; and a third set of codes for causing a computer to tune the first edge data and calculate a third image data from the second image data and the tuned first edge data.

BRIEF DESCRIPTION OF THE DRAWINGS

The above and other features and advantages of the present invention will become more apparent by describing in detail exemplary embodiments thereof with reference to the attached drawings in which:

FIG. 9 is an example of a flowchart schematically illustrating an image processing method according to another embodiment of the present invention.

DETAILED DESCRIPTION OF THE INVENTION

Exemplary embodiments of the present invention will now be described in detail with reference to the attached drawings.

Figure 3:
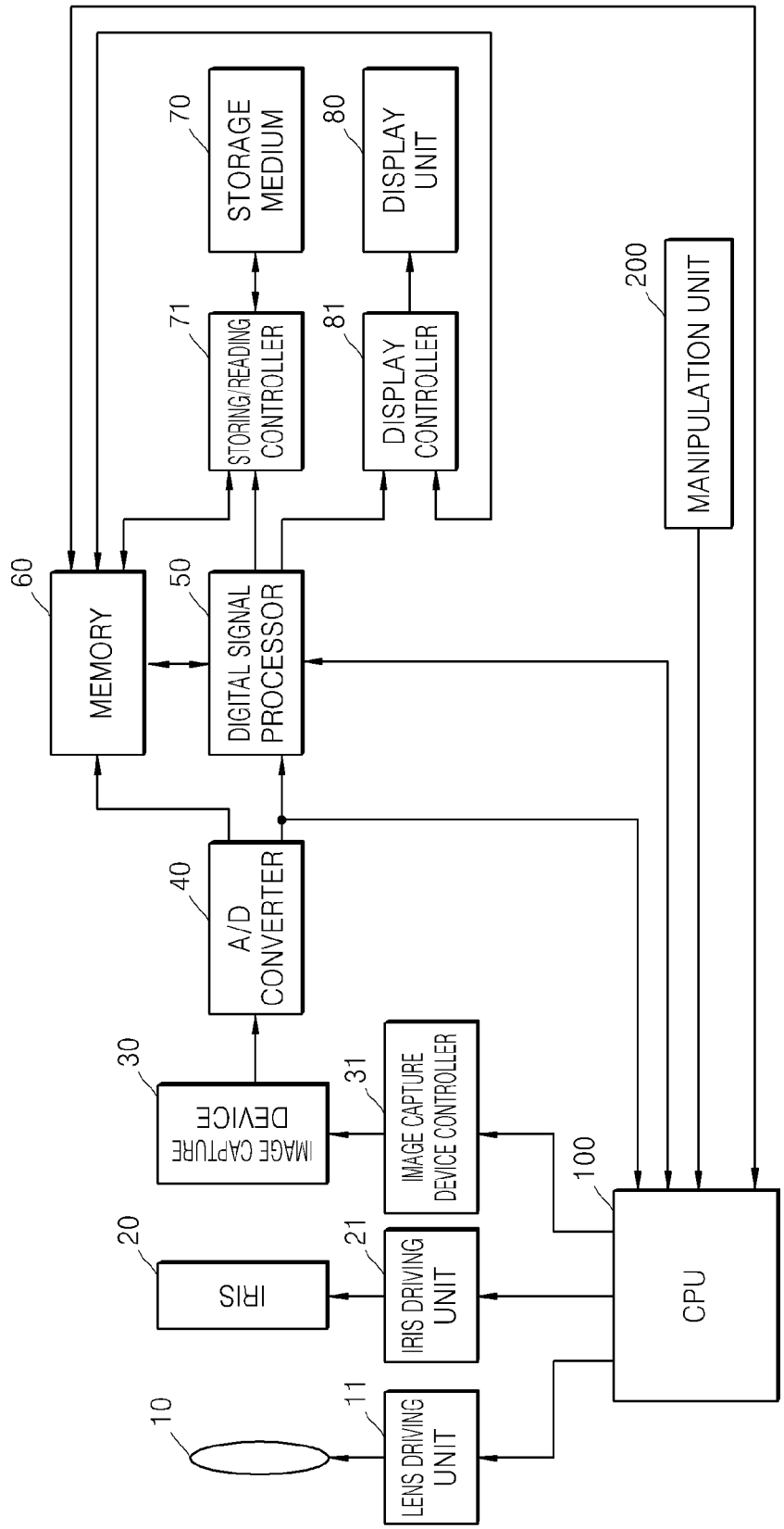
FIG. 3 is an example of a block diagram schematically illustrating a digital photographing apparatus according to an embodiment of the present invention.
Figure 4:
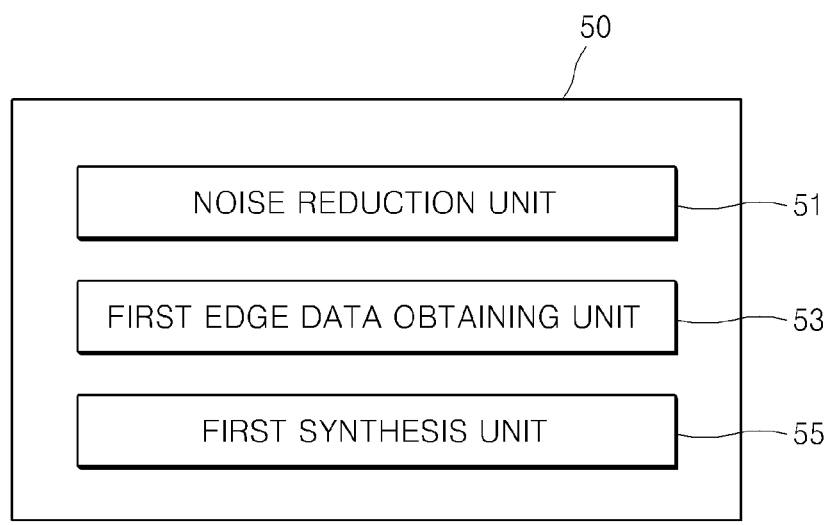
FIG. 4 is an example of a block diagram schematically illustrating a digital signal processor (DSP) of the digital photographing apparatus of FIG. 3, according to an embodiment of the present invention.

FIG. 3 is an example of a block diagram schematically illustrating an image processing apparatus, i.e., a digital photographing apparatus, according to an embodiment of the present invention. FIG. 4 is an example of a block diagram schematically illustrating a digital signal processor (DSP) 50 of the digital photographing apparatus illustrated in FIG. 3, according to an embodiment of the present invention.

In an embodiment, all operations of the digital photographing apparatus are controlled by a central processing unit (CPU) 100. The digital photographing apparatus includes a manipulation unit 200 having keys generating an electrical signal in response to a user's instruction. The electrical signal generated by the manipulation unit 200 is delivered to the CPU 100 so that the CPU 100 can control the digital photographing apparatus in response to the electrical signal.

In a shooting mode, if an electrical signal generated in response to a user's instructions is input to the CPU 100, the CPU 100 analyzes the electrical signal and controls a lens driving unit 11, an iris driving unit 21, and an image capture device controller 31, thus controlling the location of a lens 10, the degree of openness of an iris 20, and the sensitivity of an image capture device 30, respectively. The image capture device 30 generates image data from received light. An analog/digital (A/D) converter 40 converts analog data received from the image capture device 30 into digital data. The A/D converter 40 may be omitted depending on the characteristics of the image capture device 30.

Data output from the image capture device 30 is provided to the DSP 50 either via a memory 60 or not via the memory 60. If necessary, the data output from the image capture device 30 may also be provided to the CPU 100. Here, the memory 60 includes a read-only memory (ROM) or a random access memory (RAM). The DSP 50 can perform digital signal processing, such as gamma correction or white balance correction, if needed. As illustrated in FIG. 4, the DSP 50 may include a noise reduction unit 51, a first edge data obtaining unit 53, and a first synthesis unit 55 but they may be variously installed, e.g., be installed separately from the DSP 50. That is, according to another embodiment, the noise reduction unit 51, the first edge data obtaining unit 53, and the first synthesis unit 55 may be included in various locations in the digital photographing apparatus.

Data output from the DSP 50 is delivered to a display controller 81 either directly or via the memory 60. The display controller 81 controls a display unit 80 in order to display an image on the display unit 80. Image data output from the DSP 50 is input to a storing/reading controller 71 either directly or via the memory 60. The storing/reading controller 71 stores the image data in a storage medium 70, either in response to a signal received from the user or automatically. Alternatively, the storing/reading controller 71 may interpret image data from an image file stored in the storage medium 70, and provide the interpretation result to the display controller 81 via the memory 60 or via another path so that an image can be displayed on the display unit 80. The storage medium 70 can be easily attached to and detached from the digital photographing apparatus or be fixedly built into the digital photographing apparatus.

The functions of the noise reduction unit 51, the first edge data obtaining unit 53 and the first synthesis unit 55 will now be described with reference to FIG. 4.

Figure 1:
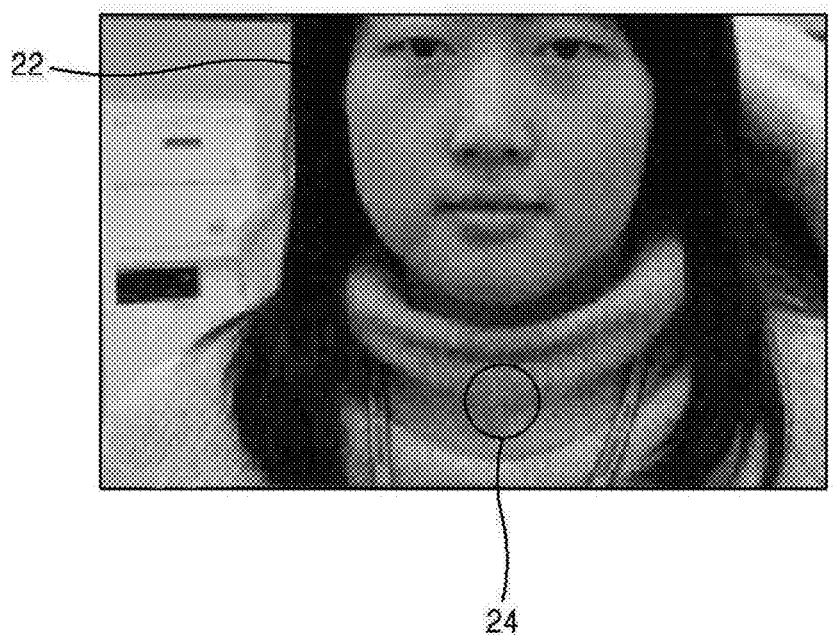
FIG. 1 is an example of a first image containing noise.
Figure 2:
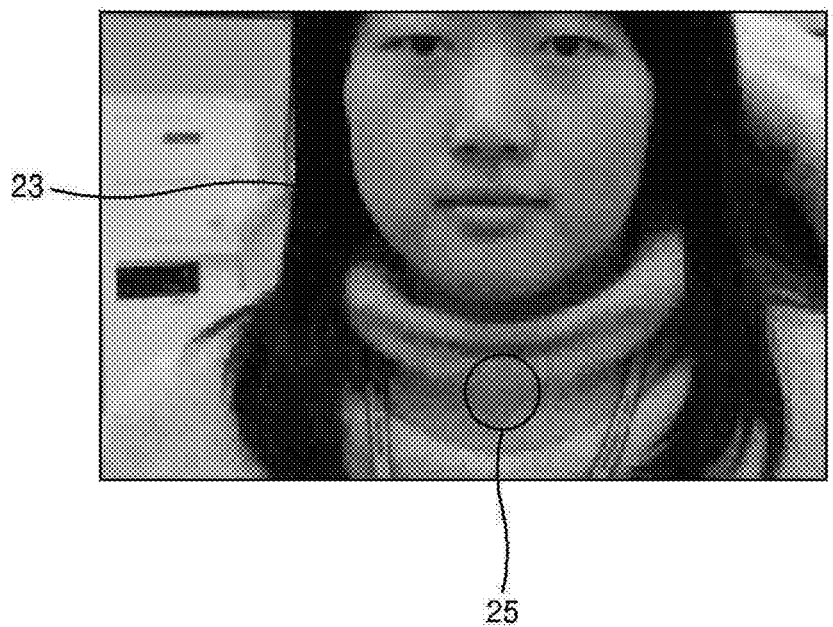
FIG. 2 is an example of a second image obtained by applying a noise reduction filter to the first image of FIG. 1.

First, the noise reduction unit 51 obtains second image data corresponding to a second image as illustrated in FIG. 2 by applying a noise reduction filter to first image data corresponding to a first image as illustrated in FIG. 1. The noise reduction unit 51 may be embodied as a bilateral filter.

The first edge data obtaining unit 53 obtains first edge data lost, which is the edge data lost when the noise reduction filter is applied to the first image data to generate the second image data that is obtained by the noise reduction unit 51.

An edge may be understood in a general image as the boundary between two subjects or a crease in a subject's clothes. The boundary between two subjects which is clearly represented may be referred to as a 'strong edge' and a crease in a subject's clothes may be referred to as a 'weak edge (minute edge)'. The degree of a strong edge is not degraded by the bilateral filter but instead the degree of a weak edge may be greatly degraded by the bilateral filter. Thus the first edge data obtaining unit 53 obtains the first edge data regarding the lost weak edges.

Figure 5A:
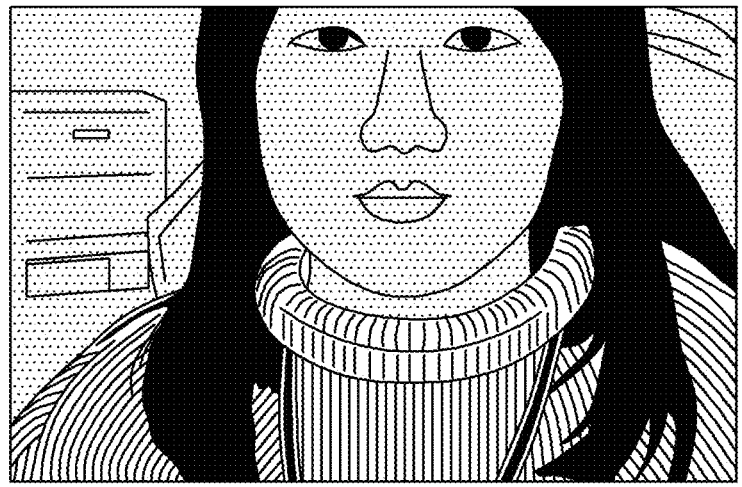
FIG. 5A is an example of an illustration of edge data calculated from the first image of FIG. 1.
Figure 5B:
FIG. 5B is an example of an illustration of edge data calculated from the second image of FIG. 2.

Such lost weak edges will be described with reference to FIGS. 5A and 5B. FIG. 5A is an example of an illustration of edge data obtained from the first image of FIG. 1. FIG. 5B is an example of an illustration of edge data obtained from the second image of FIG. 2. FIG. 5A includes more bright pixels than FIG. 5B. Parts of the edge data of FIG. 5A that are not shown in the edge data of FIG. 5B may be lost weak edges. For example, some of the edges for both edge data representing the texture of the clothes (knitwear) and edge data representing the outline of the nose of the woman are lost.

The first edge data obtaining unit 53 obtains the first edge data. For example, the first edge data obtaining unit 53 may calculate the first edge data from the difference between the first image data and the second image data, but the present invention is not limited thereto. For example, another way the first edge data obtaining unit 53 may calculate the first edge data is by calculating edge data from the first image data and calculating edge data from the second image data, and then using the difference between the two edge data. However, the first edge data obtained by the first edge data obtaining unit 53 further includes some noise data that is not included in the second image data but is included in the first image data, and thus, there is a need to lessen an effect of the noise data included in the first edge data.

To reduce the noise, the first synthesis unit 55 tunes the first edge data obtained by the first edge data obtaining unit 53, and, as a result, obtains third image data from the second image data obtained by the noise reduction unit 51 and the tuned first edge data. That is, since the second image data obtained by the noise reduction unit 51 does not include data regarding the lost weak edges which are included in the first edge data as described above, the third image data is obtained from the second image data and the first edge data. In this case, the third image data is obtained from the second image data and the tuned first edge data in order to prevent the resolution of the third image data from degrading due to the noise data in the first edge data.

The first synthesis unit 55 may tune the first edge data by reducing the amplitude of the first edge data.

Figure 6A:
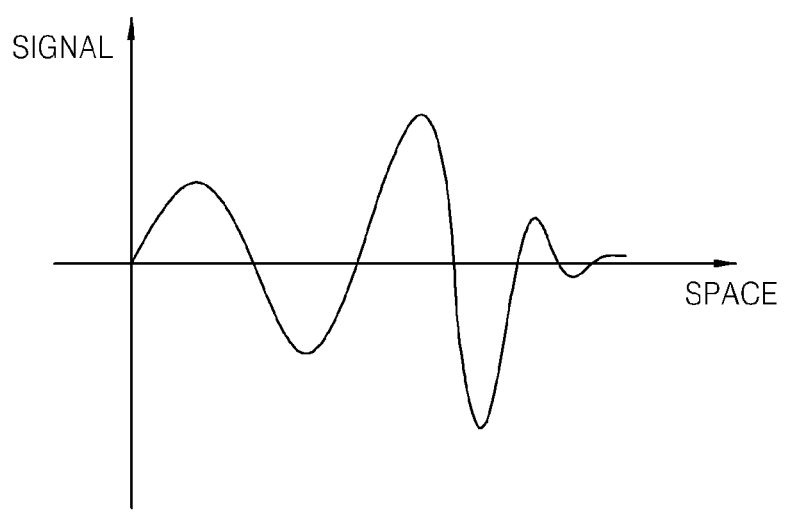
FIG. 6A is an example of a graph illustrating ideal first edge data that do not contain noise.
Figure 6B:
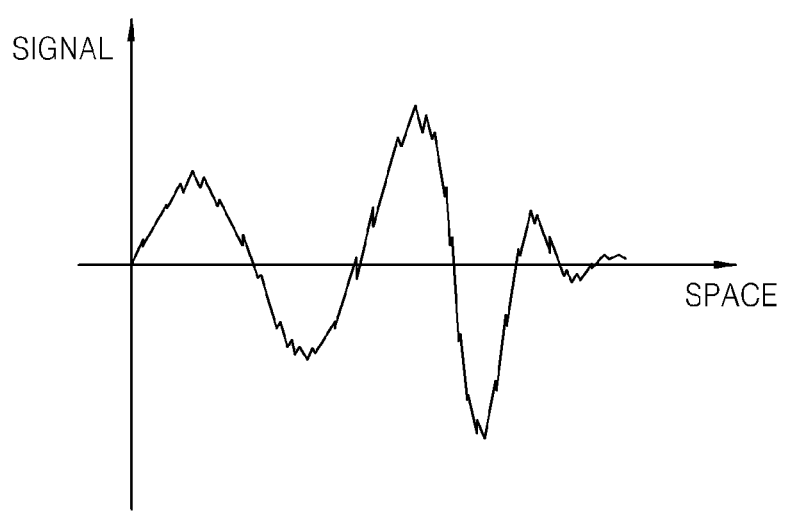
FIG. 6B is an example of a graph illustrating first edge data that contains noise.
Figure 6C:
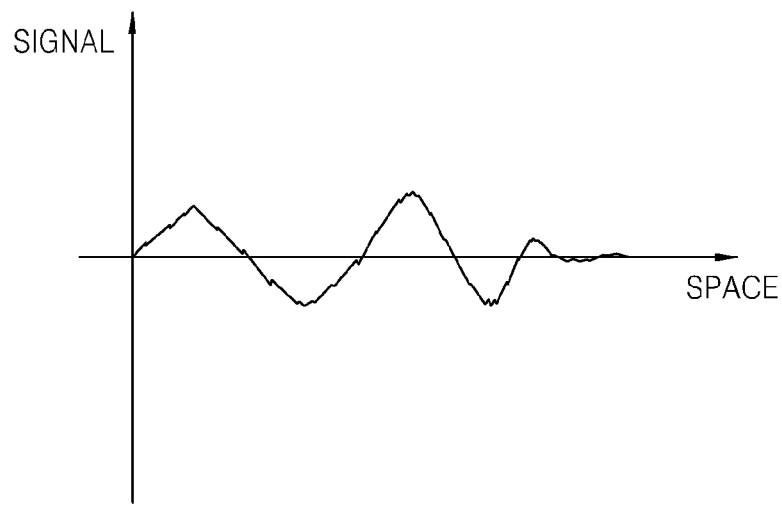
FIG. 6C is an example of a graph illustrating the result of tuning the first edge data illustrated in FIG. 6B.

FIG. 6A is an example of a graph illustrating ideal first edge data that does not contain noise. FIG. 6B is an example of a graph illustrating first edge data that contains noise. FIG. 6C is an example of a graph illustrating the result of tuning the first edge data illustrated in FIG. 6B.

FIG. 6A does not contain noise. FIG. 6B and the first edge data actually contains noise data. A comparison of the graphs of FIGS. 6A and 6B reveals that the noise data distorts the waveform of the first edge data that does not contain noise to have sharp corners. Thus the first edge data is tuned to reduce noise in the third image data which is an outcome. In detail, as illustrated in FIG. 6C, the first edge data of FIG. 6B is tuned to reduce the amplitude of the first edge data. A comparison of the graphs of FIGS. 6B and 6C reveals that the degree of distortion of the waveform of the tuned first edge data is lessened. With the example of tuned first edge data illustrated in FIG. 6C, it is possible to reduce noise in the third image data, which is an outcome image. Also, the tuned first edge data still contains data representing weak edges, and thus, weak edges appear in an image according to the third image data, thereby effectively preventing the resolution of the overall image from being substantially degraded.

The first synthesis unit 55 combines the second image data with the tuned first edge data to obtain the third image data. The first synthesis unit 55 may combine the pixels of the second image data with the corresponding pixels of the tuned first edge data to obtain the third image data. In general, when the brightness of a pixel is represented with 16 bits, the pixel has a data value from 0 to 255 ($=2^{16}-1$). Thus if the value of the third image data in the pixel is greater than a predetermined maximum value (in the case of 16-bit data, a maximum value is 255), the first synthesis unit 55 adjusts the third image data in the pixel to have the predetermined maximum value.

The image processing apparatus according to the current embodiment is a digital photographing apparatus as illustrated in FIG. 3, and thus is capable of processing image data obtained through photographing, and storing in the storage medium 70 image data corresponding to an image in which noise is reduced. However, the present invention is not limited thereto and the image processing apparatus may also be applied to other apparatuses, such as a personal digital assistant (PDA) and a personal multimedia player (PMP), as will be shown in the following embodiments and modified examples thereof.

Figure 7:
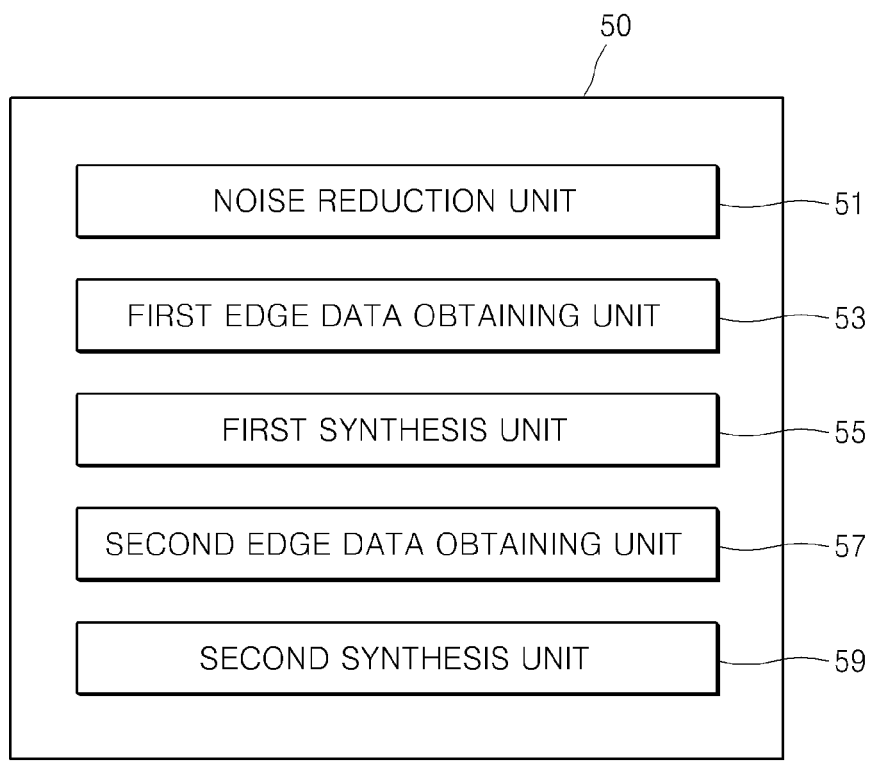
FIG. 7 is an example of a block diagram schematically illustrating a DSP of the digital photographing apparatus of FIG. 3, according to another embodiment of the present invention.

FIG. 7 is an example of a block diagram schematically illustrating the DSP 50 of the digital photographing apparatus of FIG. 3, according to another embodiment of the present invention. In the current embodiment, the DSP 50 further includes a third edge data obtaining unit 57 and a second synthesis unit 59, as compared to the DSP 50 illustrated in FIG. 4. The operations of the noise reduction unit 51, the first edge data obtaining unit 53 and the first synthesis unit 55 are substantially as described above with reference to those of FIG. 4, and thus, descriptions thereof will be omitted.

The second edge data obtaining unit 57 obtains second edge date from third image data obtained by the first synthesis unit 55, where the second edge data relates to parts of an image from the third image data which are represented as edges. Thus, the obtained second edge data includes both strong and weak edges. The second synthesis unit 59 tunes first edge data by using the second edge data, and obtains fourth image data, which is an outcome image, from second image data and the tuned first edge data.

The image from the third image data is a high-quality image in which noise is reduced without greatly degrading the resolution thereof. The DSP 50, according to the current embodiment of the present invention, maximizes the resolution of the image from the third image data. That is, the first synthesis unit 55 indiscriminately reduces the size of the first edge data containing data regarding weak edges and noise data, and the second synthesis unit 59 tunes the data regarding weak edges and the noise data at different degrees.

The second edge data obtained by the second edge data obtaining unit 57 may contain not only data regarding the strong and weak edges but also the noise data. However, the second edge data obtaining unit 57 obtains the second edge data from the third image data obtained by the first synthesis unit 55, and thus, the size of the noise data in the third image data is less than that of in the first image data. Accordingly, the size of the noise data in the second edge data is also less than that of in the first image data. Also, all the third image data is not contained in the obtained second edge data. For this reason, the amount of noise data in the second edge data is less than that of in the third image data.

The second synthesis unit 59 tunes the first edge data by using the second edge data and then obtains fourth image data, which is an output image, from the second image data and the tuned first edge data. More specifically, the second synthesis unit 59 tunes a pixel of the first edge data by multiplying the pixel of the first edge data by the corresponding pixel of the second edge data. Since the second edge data is related to edges and contains a small size of noise data, the size of data regarding edges in an image is greatly amplified but the size of noise data in the image is slightly amplified when the first edge data is multiplied by the second edge data. Thus the image resolution of the fourth image data can be effectively improved by amplifying the edge data more greatly than the noise data.

In general, when the brightness of a pixel is represented with 16 bits, the pixel has a data value from 0 to 255 ($=2^{16}-1$). Thus, if the result of multiplying first edge data in the pixel by second edge data in the pixel is greater than a predetermined maximum value, the second synthesis unit 59 adjusts the tuned first edge data in the pixel to have the predetermined maximum value.

The second synthesis unit 59 obtains fourth image data by combining second image data with first edge data, the first edge data being tuned using the second edge data. The second synthesis unit 59 may obtain fourth image data by combining each pixel of the second image data with the corresponding pixel of the first edge data, In this case, similarly, if the fourth image data in the pixel has a value greater than a predetermined maximum value, the second synthesis unit 59 may set the fourth image data to have the predetermined maximum value.

Figure 8:
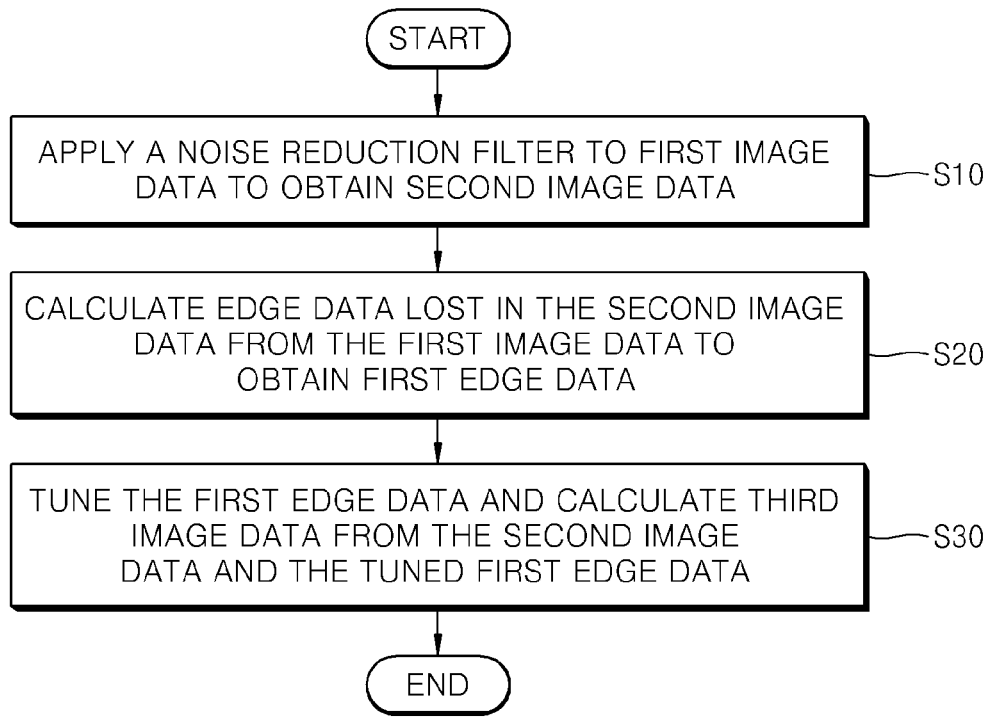
FIG. 8 is an example of a flowchart schematically illustrating an image processing method according to an embodiment of the present invention.

FIG. 8 is an example of a flowchart schematically illustrating an image processing method according to an embodiment of the present invention. Referring to FIG. 8, in the image processing method, the method begins with apply a noise reduction filter to first image data to obtain a second image (operation S10). In operation S10, a bilateral filter may be used. Then, the method continues with calculate edge data lost in the second image data from the first image data to obtain the first edge data (operation S20). In detail, the first edge data may be calculated using the difference between the first image data and the second image data. Then, the method continues with tune the first edge data and calculate third image data from the second image data and the tuned first edge data (operation S30). The first edge data may be tuned to reduce the amplitude of the first edge data, thereby effectively preventing image resolution from being degraded due to noise. The third image data may be obtained by combining second image data in a pixel with the result of tuning first edge data in the pixel. In this case, if the third image data in the pixel has a value greater than a predetermined maximum value, the third image data may be set to have the predetermined maximum value.

FIG. 9 is a flowchart schematically illustrating an image processing method according to another embodiment of the present invention. Referring to FIG. 9, after performing operations S10 through S30 as described above with reference to FIG. 8, the method may continue with calculate edges of the third image data to obtain second edge data (operation S40). Then, the method may continue with tune the first edge data by using the second edge data, and calculate fourth image data from the second image data and the tuned first edge data (operation S50). In operation S50, the first edge data may be tuned by multiplying pixels of the first edge data by the corresponding pixels of the second edge data. In this case, if the result of multiplying a pixel of the first edge data by a pixel of the second edge data is greater than a predetermined maximum value, the pixel may be set to have the predetermined maximum value. Also, in operation S50, the fourth image data may be obtained by combining second image data with the result of tuning first edge data by using the second edge data. In this case, if the fourth image data has a value greater than a predetermined maximum value, the fourth image data may be set to have the predetermined maximum value.

With the image processing methods according to the above embodiments, it is possible to effectively reduce noise in an image without degrading the resolution of the image.

A program that executes in an image processing apparatus and the image processing methods according to the above embodiments of the present invention and/or modified examples thereof may be stored in a recording medium. For example, the recording medium may be embodied as the storage medium 70 or the memory 60 of FIG. 3, or an additional type of recording medium. The examples of the recording medium include a magnetic recording medium, e.g., a read-only memory (ROM), a floppy disc, or a hard disc, and an optical recording medium, e.g., a compact disc (CD)-ROM or a digital versatile disc (DVD). Additionally, a program that executes in an image processing apparatus and the image processing methods according to the above embodiments of the present invention and/or modified examples thereof may be transmitted to an apparatus over the Internet.

The various illustrative logics, logical blocks, and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

As described above, according to an image processing method and apparatus and a recording medium storing a program for executing the method, it is possible to effectively reduce noise in an image.

While this invention has been particularly shown and described with reference to exemplary embodiments thereof, it will be understood by one skilled in the art that various changes in form and details may be made therein without departing from the spirit and scope of the invention as defined by the appended claims.

What is claimed is:

1. An image processing apparatus comprising:
a noise reduction unit configured to apply a noise reduction filter to first image data to obtain second image data;
a first edge data obtaining unit configured to calculate edge data lost in the second image data compared with the first image data to obtain first edge data;
a first synthesis unit configured to tune the first edge data to generate first tuned first edge data and calculate third image data from the second image data and the first tuned first edge data;
a second edge data obtaining unit configured to calculate edges in the third image data to obtain second edge data; and
a second synthesis unit configured to tune the first edge data to generate second tuned first edge data by multiplying a pixel of the first edge data by the corresponding pixel in the second edge data and to calculate fourth image data from the second image data and the second tuned first edge data.

2. The apparatus of claim 1, wherein the noise reduction unit comprises a bilateral filter.

3. The apparatus of claim 1, wherein the first edge data obtaining unit calculates the first edge data from the difference between the first image data and the second image data.

4. The apparatus of claim 1, wherein the first synthesis unit is further configured to generate the first tuned first edge data by reducing the amplitude of the first edge data.

5. The apparatus of claim 1, wherein the second synthesis unit is further configured to set the second tuned first edge data of a pixel of the first edge data to a predetermined maximum value if the result of multiplying the pixel of the first edge data by the corresponding pixel of the second edge data is greater than the predetermined maximum value.

6. The apparatus of claim 1, wherein the first synthesis unit is further configured to combine the second image data with the first tuned first edge data on a pixel by pixel basis.

7. The apparatus of claim 6, wherein the first synthesis unit is further configured to set a pixel value in the third image data to a predetermined maximum value when a pixel value in the third image has a value greater than a predetermined value.

8. The apparatus of claim 1, wherein the second synthesis unit is further configured to calculate the fourth image data by combining the pixels of the second image data with the corresponding pixels of the second tuned first edge data.

9. The apparatus of claim 8, wherein the second synthesis unit is further configured to set a pixel of the fourth image data to a predetermined maximum value when the pixel has a value greater than the predetermined maximum value.

10. An image processing method comprising:
applying a noise reduction filter to first image data to obtain second image data;
calculating edge data lost in the second image data from the first image data to obtain first edge data;
tuning the first edge data to generate first tuned first edge data and calculating third image data from the second image data and the first tuned first edge data;
calculating edges in the third image data to obtain second edge data; and
tuning the first edge data to generate second tuned first edge data by multiplying a pixel of the first edge data by the corresponding pixel of using the second edge data; and
calculating fourth image data from the second image data and the second tuned first edge data.

11. The method of claim 10, wherein applying further comprises: applying a bilateral filter to a first image data to obtain a second image data.

12. The method of claim 10, wherein calculating first edge data further comprises: calculating first edge data lost in the second image data from the first image data based on the difference between the first image data and the second image data.

13. The method of claim 10, wherein generating said first tuned first edge data further comprises: tuning the first edge data by reducing the amplitude of the first edge data.

14. The method of claim 10, further comprising: if the result of multiplying is greater than a predetermined maximum value, then setting the value of the pixel to the predetermined maximum value.

15. The method of claim 10, wherein generating the first tuned first edge data and calculating further comprise: tuning the first edge data to generate the first tuned first edge data and calculating third image data by combining the second image data on a pixel by pixel basis with the first tuned first edge data.

16. The method of claim 15, further comprising: setting a pixel of the third image data to a predetermined maximum value if the pixel of the third image data has a value greater than the predetermined maximum value.

17. The method of claim 10, wherein calculating said fourth image data further comprises combining pixels of the second image data with the corresponding pixels of the tuned first edge data.

18. The method of claim 17, wherein calculating said fourth image data further comprises: if a pixel of the fourth image data has a value greater than a predetermined maximum value, then setting the pixel to have the predetermined maximum value.

19. A non-transitory computer readable medium encoded with a computer executable program that when executed by a computer causes the computer to perform the following image processing method:
 applying a noise reduction filter to first image data to obtain a second image;
 calculating edge data lost in the second image data from the first image data to obtain first edge data;
 tuning the first edge data to generate first tuned first edge data and calculating a third image data from the second image data and the first tuned first edge data;
 calculating edges in the third image data to obtain second edge data;
 tuning the first edge data to generate second tuned first edge data by multiplying a pixel of the first edge data by the corresponding pixel in the second edge data; and
 calculating fourth image data from the second image data and the second tuned first edge data.

20. A computer program product, comprising:
 a non-transitory computer-readable medium comprising:
 a first set of codes for causing a computer to apply a noise reduction filter to first image data to obtain a second image; and
 a second set of codes for causing a computer to calculate edge data lost in the second image data compared with the first image data to obtain first edge data;
 a third set of codes for causing a computer to tune the first edge data to generate first tuned first edge data and calculate a third image data from the second image data and the first tuned first edge data
 a fourth set of codes for causing a computer to calculate edges in the third image data to obtain second edge data; and
 a fifth set of codes for causing a computer to tune the first edge data to generate second tuned first edge data by multiplying a pixel of the first edge data by the corresponding pixel in the second edge data and calculate fourth image data from the second image data and the second tuned first edge data.

* * * * *